April 9, 1929.  A. P. JOHNSTON  1,708,097
ELECTROTYPE OR ENGRAVER'S PLANER
Filed Feb. 14, 1927
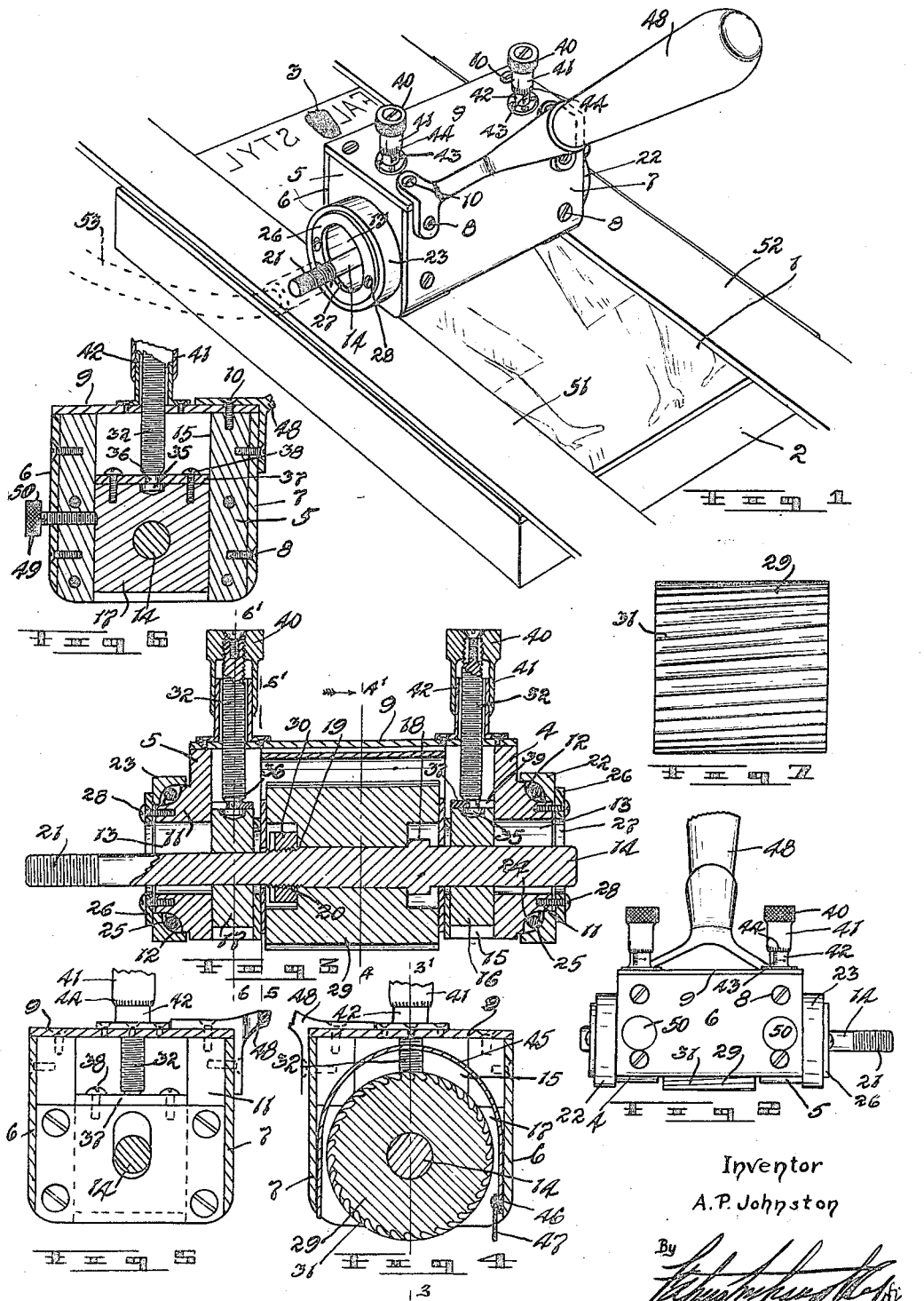
Inventor
A. P. Johnston
By 

Patented Apr. 9, 1929.

1,708,097

UNITED STATES PATENT OFFICE.

ALFRED P. JOHNSTON, OF WINNIPEG, MANITOBA, CANADA.

ELECTROTYPE OR ENGRAVER'S PLANER.

Application filed February 14, 1927. Serial No. 168,103.

The invention relates to improvements in electrotype or engraver's planers and an object of the invention is to provide a driven tool which will permit the engraver to easily and quickly plane down soldered repairs on electrotypes or the like and further to construct the tool so that it can be accurately adjusted for the work in hand and further such that the tool can be readily taken apart for inspection, cleaning, sharpening or other purposes.

With the above more important objects in view, the invention consists essentially in the arrangement and construction of parts hereinafter more particularly described, reference being had to the accompanying drawing, in which:

Fig. 1 is a perspective view of the tool as it appears in use.

Fig. 2 is a front view of the tool with part of the handle removed.

Fig. 3 is an enlarged detailed vertical sectional view centrally and longitudinally through the tool, the section being taken in the plane indicated by the line 3—3′ Figure 4.

Fig. 4 is a vertical sectional view transversely through the machine, the section being taken in the plane indicated by the line 4—4′ Figure 3.

Fig. 5 is a vertical sectional view at 5—5′ Figure 3.

Fig. 6 is a vertical sectional view at 6—6′ Figure 3.

Fig. 7 is a side view of the rotary cutter.

In the drawing like characters of reference indicate corresponding parts in the several figures.

At the present time when an electrotype or the like is damaged or a replacement has to be made, the defective or part to be altered is repaired by using solder to either build up the damaged part or hold the replaced part in place. This solder has to be worked or cut and the cutting is usually done by employing a chisel.

The job is accordingly rather a laborious one and requires extreme care and in order to make the above explanation clearer, I have shown an electrotype in Figure 1 of the drawing, the customary plate 1 being mounted on the usual supporting block 2. The electrotype is herein shown as provided with letters at the upper end and one of these letters is considered as damaged and the space occupied by the damaged letter is herein shown as filled in with solder 3. This solder requires to be first cut down accurately to the level of the upper face of the electrotype and then subsequently the solder is cut to form the missing letter. Ordinarily the work of cutting down the solder to the level of the face of the electrotype is done by a chisel as is also the subsequent forming of the letter and such work is not only laborious but requires extreme care.

According to my invention, however, I provide a tool having a driven rotary knife therein which can be adjusted to the cut and which when in use will cut or plane the solder easily, quickly and accurately to the level of the face of the electrotype or such like. The machine provided is now described in detail.

The casing or body of the machine comprises two similar right and left end heads 4 and 5, front and back plates 6 and 7 fastened thereto by screws 8 and a top plate 9 also fastened to the heads by screws 10. The bottom of the casing is open. Each of the head plates is provided with an extending boss or hub 11 and the boss is provided on the outer face with a circumscribing ball raceway 12 and is centrally apertured as indicated at 13 to receive the driving shaft 14, it being here observed that the opening or aperture is considerably larger than the shaft so that the shaft is permitted a vertical movement.

The heads are also vertically slotted as indicated at 15 to receive slidably bearing blocks 16 and 17 and these bearing blocks carry rotatably the shaft. Adjoining the bearing block 16, the shaft is provided with a collar 18 and adjoining the other bearing block, the shaft is shouldered as indicated at 19 and has screw threads 20 adjoining the shoulder. The left hand end of the shaft is screw threaded as indicated at 21.

Similar annular rollers 22 and 23 are mounted on the bosses, the rollers being provided with internal ball raceways 24 complementary to those 12 and ball bearings 25 are inserted between the ball raceways. The rollers are held in place by annular plates 26, the central apertures 27 of which register with those 13. The annular plates are fastened to the bosses by screws 28. It will be observed that the lower sides of the rollers extend slightly beyond the under face of the casing so that the tool rides on the rollers.

The rotary cutter 29 is in the form of a cylindrical multi-bladed knife and it is placed on the shaft between the heads and has the ends thereof cored out and one end engaging the shoulder 18 and the other end engaged by a nut 30 screw threading on the threads 19 of the shaft. The nut 30 when tightened up effectively jams the cutter and holds it to the shaft. Such arrangement permits of the ready removal of the cutter from the shaft for sharpening purposes. It will be observed that the blades 31 of the cutter spiral slightly.

Means is provided for very accurately adjusting the bearing blocks and consequently the rotary cutter, such being herein shown as micrometers and each is constructed as now described.

An adjusting screw 32 having the threads thereof comparatively fine is screw threaded through the top plate and has the lower end thereof attached to the bearing block in a manner such that the screw is anchored to the block but is permitted to freely rotate in respect to the same. This is accomplished by providing a head 35 at the lower extremity of the screw which is connected to the screw body by a contracted neck 36. The head 35 is pocketed in the block and a retaining plate 37 is fastened by screws 38 to the block, the retaining plate being provided with a slot 39 which receives the neck and overlies the head 35.

To the upper end of the screw in each instance, I secure a finger piece 40 which is provided with a downwardly extending sleeve 41, the sleeve receiving telescopically an upstanding stationary sleeve 42 which is secured to the top plate 9. The inner sleeve 42 is provided with a vertically extending scale 43 and the lower end of the outer sleeve is provided with a circumscribing graduated scale 44. The distance between each mark on the vertical scale indicates the pitch of the thread of the screw 32 and the distance between the marks of the horizontal scale on the outer sleeve indicates a definite fraction of a revolution of the sleeve. Accordingly by turning the finger pieces 40 and observing the readings on the scales, one can accurately gauge the position of the bearing blocks and accordingly the position of the face of the cutter 29.

Within the casing I locate a curved guard plate 45 which passes over the cutting blade and has the forward edge thereof secured by suitable bolts 46 to the plate 6. This guard prevents clippings from lodging in the interior of the casing. A flexible strip 47 is also secured to the casing by the latter bolts and is adapted to prevent the knives from throwing the clippings ahead and onto the electroplate. A handle 48 is attached to the upper rear corners of the casing by the screws 8 and 10. Means is provided for positively locking the bearing blocks in their adjusted position and such is accomplished in the present instance by providing similar adjusting screws 49 which screw thread through the front plate 6 and heads 4 and 5 and have their inner ends engageable with the bearing blocks and their outer ends provided with finger pieces 50.

When one desires to repair say a damaged letter on an electrotype which has been soldered over as indicated at 3, he can place two metal bars 51 and 52 on the face of the electrotype as shown in Figure 1. He then places the tool in a position such that the rollers 22 and 23 will ride the bars and the rotary cutter will be clear of the bars. He next carefully adjusts the screws 32 to position the rotary cutter so that it will cut the solder 3 to the level of the upper face of the electrotype. Having done this, the set screws 49 are tightened up against the blocks. The shaft 14 of the tool is then driven at a high speed whilst the tool is being moved over the solder. The blades of the rotary cutting knife will cut the solder so that it is flush with the upper face of the electrotype. Any suitable means can be employed for driving the shaft 14, such being herein shown in dotted outline in Figure 1 as a flexible driving shaft 53 coupled to the screw threaded end of the shaft 14.

If the surface of the electrotype be relatively smooth, one does not require to use the bars 51 and 52 as the rollers can then ride the face of the electrotype and the rotary cutter can be adjusted accordingly. This tool can be used on flat or curved electrotypes or other plates as will be readily understood by one familiar with the art.

What I claim as my invention is:—

1. An electrotype or engraver's planer comprising a casing fitted with end rollers and a handle and having the under side thereof open, a pair of bearing blocks slidably mounted in the ends of the casing and movable in a direction towards or away from the open side thereof, adjusting screws screw threading through the ends of the top of the casing and having their lower ends swivelly attached to the bearing blocks and their upper ends provided with finger pieces, registering adjusting scales carried by the screws and the top of the casing respectively, a drive shaft rotatably mounted in the bearing blocks and having one end extending through the end of the casing and a cylindrical rotary cutter mounted on the shaft within the casing and presenting spiralling cutting blades.

2. In combination, a pair of opposing end heads provided at their inner sides with vertical slots forming guideways and at their outer sides with extending bosses and having elongated vertically disposed apertures passing through the bosses and opening to the slots, front, back and top plates connecting the heads together, opposing bearing blocks slidably mounted in the guideways, a driving shaft rotatably carried by the bearing blocks and extending through the apertures in the heads and vertically shiftable in said apertures, a rotary cutter in the form of a cylindrical multi-bladed knife secured to the shaft between the bearing blocks, annular rollers rotatably mounted on the bosses and having their lower sides projecting beyond the lower edges of the heads and means for vertically adjusting the blocks in the guideways.

Signed at Winnipeg, this 21st day of January, 1927.

ALFRED P. JOHNSTON.